US006631222B1

(12) United States Patent
Wagener et al.

(10) Patent No.: US 6,631,222 B1
(45) Date of Patent: Oct. 7, 2003

(54) RECONFIGURABLE OPTICAL SWITCH

(75) Inventors: Jefferson L. Wagener, Aberdeen, WA (US); Thomas Andrew Strasser, Warren, NJ (US)

(73) Assignee: Photuris, Inc., Piscataway, NJ (US)

( * ) Notice: Subject to any disclaimer, the term of this patent is extended or adjusted under 35 U.S.C. 154(b) by 0 days.

(21) Appl. No.: 09/571,833

(22) Filed: May 16, 2000

(51) Int. Cl.[7] ................................................. G02B 6/35
(52) U.S. Cl. .............................. 385/16; 385/17; 385/18; 385/31
(58) Field of Search ............................... 385/16, 17, 18, 385/24, 31, 33, 47; 359/131, 196, 212, 127, 124

(56) References Cited

U.S. PATENT DOCUMENTS

| | | | |
|---|---|---|---|
| 4,244,045 A | 1/1981 | Nosu et al. ..................... 370/3 |
| 4,626,066 A | 12/1986 | Levinson ................... 350/96.18 |
| 5,479,082 A | 12/1995 | Calvani et al. .............. 359/127 |
| 5,504,827 A | 4/1996 | Schimpe ....................... 385/24 |
| 5,583,683 A | 12/1996 | Scobey ....................... 359/127 |
| 5,612,805 A | 3/1997 | Fevrier et al. ............... 359/124 |
| 5,621,829 A | 4/1997 | Ford ............................. 385/22 |
| 5,808,763 A | * 9/1998 | Duck et al. ................. 357/127 |
| 5,835,517 A | 11/1998 | Jayaraman et al. ........... 372/50 |
| 5,841,917 A | 11/1998 | Jungerman et al. .......... 385/17 |
| 5,915,050 A | 6/1999 | Russell et al. ................. 385/7 |
| 5,920,411 A | * 7/1999 | Duck et al. .................. 359/127 |
| 5,959,749 A | 9/1999 | Danagher et al. ........... 359/124 |
| 5,960,133 A | 9/1999 | Tomlinson .................... 385/18 |
| 5,974,207 A | 10/1999 | Aksyuk et al. ................ 385/24 |
| 6,005,993 A | * 12/1999 | MacDonald .................. 385/16 |
| 6,008,920 A | * 12/1999 | Hendrix ...................... 359/127 |
| 6,028,689 A | 2/2000 | Michalicek et al. ......... 359/224 |
| 6,075,632 A | * 6/2000 | Braun .......................... 359/124 |
| 6,289,148 B1 | * 9/2001 | Lin et al. ....................... 385/24 |
| 6,327,398 B1 | 12/2001 | Solgaard et al. .............. 385/18 |

FOREIGN PATENT DOCUMENTS

JP       60-88907    *   5/1985

OTHER PUBLICATIONS

E. Murphy, *Optical Fiber Telecommunications IIIB*, Chapter 10, edited by T. Koch and I. Kaminow, Academic Press.

C.R. Doerr, Proposed WDM Cross Connect Using A Planar Arrangement of Waveguide Grating Routers and Phase Shifters, *Photonics Technology Letters*, vol. 10, No. 4, Apr. 1998.

C.R. Giles, et al., "Low–Loss ADD/DROP Multiplexers for WDM Lightwave Networks," Tenth International Conference on Integrated Optics and Optical Fibre Communication, IOOC, vol. 3, Jun. 29, 1995.

JDS Uniphase Corporation, Add–Drop Modules, Product Bulletin 2000, Ontario, Canada.

D.O.Culverhouse et al., Low–loss all–fiber acousto–optic tunable filter, *Optical Society of America*, vol. 22, No. 2, Jan. 15, 1997, pp. 96–98.

Roberto Sabella et al., "Impact of Transmission Performance on Path Routing in All–Optical Transport Networks,", *Journal of Lightware Technology*, vol. 16, No. 11 (Nov. 1998),pp. 1965–1971.

* cited by examiner

*Primary Examiner*—John D. Lee
*Assistant Examiner*—Juliana K. Kang
(74) *Attorney, Agent, or Firm*—Mayer Fortkort & Williams, PC; Stuart H. Mayer, Esq.

(57) ABSTRACT

An optical switch includes at least one input port for receiving a WDM optical signal having a plurality of wavelength components, at least three output ports, and a plurality of wavelength selective elements each selecting one of the wavelength components from among the plurality of wavelength components. A plurality of optical elements are also provided, each of which are associated with one of the wavelength selective elements. Each of the optical elements direct the selected wavelength component that is selected by its associated selected element to a given one of the output ports independently of every other wavelength component. The given output port is variably selectable from among all the output ports.

88 Claims, 3 Drawing Sheets

RECONFIGURABLE OPTICAL SWITCH

STATEMENT OF RELATED APPLICATIONS

This application claims the benefit of priority to U.S. Provisional Patent Application Ser. No. 60/182,289, filed Feb. 14, 2000, entitled "An all Optical Router With Petabyte Per Second Switching Capability."

FIELD OF THE INVENTION

The invention relates generally to an optical communications system and more particularly to an optical switch for flexibly routing light in a wavelength-selective manner.

BACKGROUND OF THE INVENTION

Significant interest exists in multi-wavelength communication systems, which are typically referred to as Wavelength Division Multiplexed (WDM) systems. These systems use a WDM optical signal having different wavelength components that support different streams of information. While WDM systems were initially investigated to increase the information capacity that a fiber could transmit between two points, recent improvements in optical filtering technology, among other things, has led to the development of switching elements which allow a complex network of paths to be constructed that differ from wavelength to wavelength. Furthermore, in addition to the availability of wavelength dependent switching elements in which a given wavelength is routed along a given path, reconfigurable optical elements have become available. Such reconfigurable optical elements can dynamically change the path along which a given wavelength is routed to effectively reconstruct the topology of the network as necessary to accommodate a change in demand or to restore services around a network failure.

Examples of reconfigurable optical elements include optical Add/Drop Multiplexers (OADM) and Optical Cross-Connects (OXC). OADMs are used to separate or drop one or more wavelength components from a WDM signal, which is then directed onto a different path. In some cases the dropped wavelengths are directed onto a common fiber path and in other cases each dropped wavelength is directed onto its own fiber path. OXCs are more flexible devices than OADMs, which can redistribute in virtually any arrangement the components of multiple WDM input signals onto any number of output paths.

The functionality of the previously mentioned reconfigurable optical elements can be achieved with a variety of different devices. For example, a common approach employs any of a number of different broadband switching fabrics inserted between a pair of demultiplexers/multiplexers. Examples of OADM elements are disclosed in U.S. Pat. Nos. 5,504,827, 5,612,805, and 5,959,749, and general OXC switching architecture is reviewed by E. Murphy in chapter 10 of *Optical Fiber Telecommunications IIIB*, edited by T. Koch and I. Kaminow. As shown in these references, these approaches sequentially demultiplex the wavelengths, perform the necessary switching and then remultiplex, where the OXC can direct a given wavelength onto any output because a conventional OXC uses a relatively complex MxM device for the switching fabric, while OADMs are less flexible due to their use of an array of 2×2 optical switches that can only direct between one of two outputs. Two alternate approaches to OADMs employ switchable mirrors effectively inserted between a device that simultaneously performs wavelength demultiplexing and multiplexing. The first of these approaches uses a thin film dielectric demultiplexer/multiplexer that is traversed twice by the wavelengths (e.g., U.S. Pat. No. 5,974,207), while the second approach uses dispersion from a bulk diffraction grating to demultiplex (separate) the wavelength channels before they reflect off an array of tiltable mirrors (U.S. Pat. No. 5,960,133). Another set of OADM technologies employ 4-port devices that drop multiple wavelengths onto a single fiber output in a reconfigurable manner, and thus require an additional demultiplexer if the channels need to undergo broadband optoelectronic conversion at the receiver. One realization of such functionality uses fiber optic circulators added to a two-port version of the previously-described diffraction grating demultiplexer and tilt mirror array (Ford et al., Postdeadline papers LEOS '97, IEEE Lasers and Electro-Optics Society). A second realization uses integrated silica waveguide technology (e.g., Doerr, IEEE Phot. Tech. Lett '98) with thermo-optic phase shifters to switch between the add and drop states for each wavelength. Another four-port OADM employs a fiber optic circulator and an optional tunable fiber grating reflector to route the dropped channels (e.g., C. R. Giles, IOOC '95, JDS 2000 catalog)

All of the aforementioned conventional optical switching technologies have shortcomings. These devices generally fall into two classes with respect to their shortcomings: very flexible devices with high cost and high optical loss, and lower flexibility devices, which are less expensive and have lower optical loss. The most flexible OXCs can be programmed to switch the path of any of a large number of wavelengths, each onto its own fiber (e.g. demux/mux with switches), however these devices may have up to 20 dB of insertion loss and therefore require an optical amplifier to compensate for the loss. This substantially adds to the cost of an already expensive device. Because these devices are so costly, less flexible alternatives such as fiber gratings and thin film filters are often used. While these devices have a significantly lower cost and insertion loss (2-5 dB/node), they are typically less flexible because they are implemented as fixed wavelength OADMs that cannot be reconfigured. These devices are also inflexible because as you scale them so that they drop more wavelengths their loss, cost, size and/or complexity increase to the point that the more flexible OXC alternatives become more attractive. Recently, as shown in U.S. Pat. No. 5,479,082, some flexibility has been added to these lowest cost OADM devices so that they can selectively drop or pass a predetermined subset of wavelengths that was previously designated as fixed. In addition, the previously described reconfigurable OADM devices offer somewhat enhanced flexibility, but typically at the expense of higher insertion loss (for Demux/switches), limited wavelength resolution (for bulk grating approaches), and/or higher cost for additional Mux/Demux equipment used in connection with four-port devices.

One particular limitation of the conventional OXC and OADM approaches, which demultiplex the incoming signal before optical switching is performed, is that each output port can only drop a particular fixed wavelength that cannot be altered. In this configuration each switch is arranged so that it only receives a preselected wavelength component from the demultiplexer, and therefore can only output that particular wavelength. Unless subsequent optical switching is used, the flexibility of these devices is limited since it is not possible to redirect a given wavelength from one output port to another output port or to redirect multiple wavelengths to a given output port, should that become necessary. This functionality is desirable when a unique element within the network is accessible through a particular port, and it is desirable to (a) change the wavelength channel directed to that port, or (b) direct additional wavelengths over that particular fiber accessed via that port. Two situations where this functionality proves useful is when a link needs to be restored using an alternate wavelength, or when the information capacity directed to a specific port needs to be increased by adding additional WDM wavelengths down the same fiber.

In view of the important role of optical switching to the flexibility and thus the value of an optical communications network, it would be advantageous to provide a switching element that does not have the shortcomings of the previously mentioned devices.

Accordingly, there is a need for an optical switching element that is inexpensive, imparts relatively low loss to optical signals and which is sufficiently flexible to direct each and every wavelength component from any input port to any output port independently of one another.

SUMMARY OF THE INVENTION

The present invention provides an optical switch that includes at least one input port for receiving a WDM optical signal having a plurality of wavelength components, at least three output ports, and a plurality of wavelength selective elements each selecting one of the wavelength components from among the plurality of wavelength components. A plurality of optical elements are also provided, each of which are associated with one of the wavelength selective elements. Each of the optical elements direct the selected wavelength component that is selected by its associated selected element to a given one of the output ports independently of every other wavelength component. The given output port is variably selectable from among all the output ports.

In accordance with one aspect of the invention, the optical switch includes a free space region disposed between the input port and the wavelength selective elements.

In accordance with another embodiment of the invention, the wavelength selective elements are thin film filters each transmitting therethrough a different one of the wavelength components and reflecting the remaining wavelength components.

In accordance with yet another embodiment of the invention, the optical elements are mirrors that are selectively tiltable in a plurality of positions such that in each of the positions the mirrors reflect the wavelength component incident thereon to a different one of the output ports. The tiltable mirrors may be actuated by a microelectromechanical system or a piezoelectric system, for example.

The present invention also provides a method for directing at least first and second wavelength components of a WDM signal, which includes a plurality of wavelength components, from an input port to selected ones of a plurality of output ports. The method begins by demultiplexing the first wavelength component from the WDM signal. The first wavelength component is then directed to a given output port. The second wavelength component is also demultiplexed from the WDM signal and directed to one of the output ports selected independently from the given output port.

In accordance with one aspect of the invention, the step of demultiplexing and directing the second wavelength component is performed after the step of demultiplexing and directing the first wavelength component.

In accordance with another aspect of the invention, the steps of directing the first and second wavelength components includes the steps of directing the first and second wavelength components through a free space region.

In accordance with yet another aspect of the invention, the first wavelength is demultiplexed by a thin film filter having a passband corresponding to the first wavelength.

In accordance with another aspect of the invention, the first wavelength component is directed through the free space region by a tiltable mirror.

In accordance with another aspect of the invention, the demultiplexing and directing steps are performed by a plurality of narrow band free space switches. Alternatively, the demultiplexing and directing steps are performed by a plurality of tunable, wavelength selective couplers.

DETAILED DESCRIPTION

Figure 1:
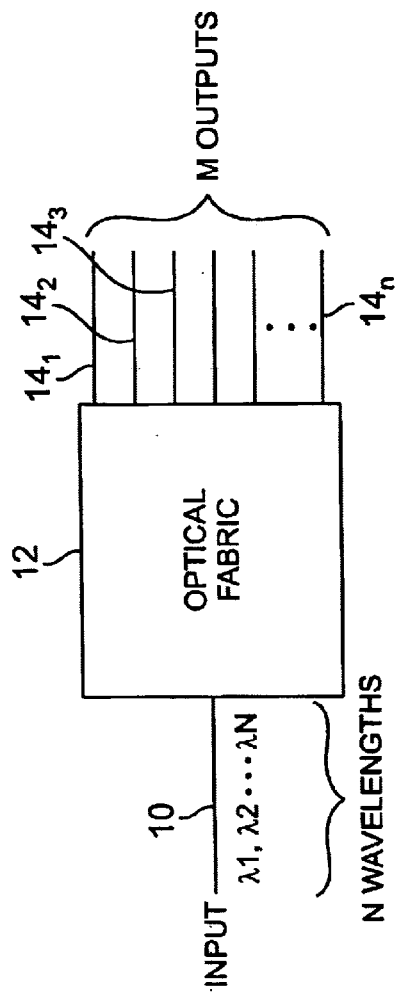
FIG. 1 shows the functionality to be achieved by an optical switching fabric constructed in accordance with the present invention.

FIG. 1 shows the functionality to be achieved by an optical switching fabric constructed in accordance with the present invention. A wavelength division multiplexed (WDM) signal is received on input port 10. Additional input ports may also be provided to accept additional WDM signals. Optical switching fabric 12 is designed to direct the individual wavelength components of the WDM signal to select ones of the output ports $14_1$, $14_2$, . . . $14_n$. That is, switching fabric 12 can selectively direct any wavelength component from any input port to any output port, independent of the routing of the other wavelengths.

It should be noted that switching fabric 12 operates in a symmetric manner so that any wavelength components directed to any of the output ports can be alternatively directed to any of the input ports. Accordingly, one of ordinary skill in the art will recognize that the switching paths are reciprocal, and thus the terms input and output as used herein are not limited to elements that transmit a WDM signal or wavelength component in a single direction relative to the switching fabric. In other words, when light enters the device from any so-called output port, this output port serves as an input port, and similarly, any so-called input port can equally serve as an output port.

As explained below, the present invention can achieve the functionality depicted in FIG. 1 in a variety of different ways. The different arrangements can be broadly divided into two categories. In the first category, filters having fixed transmission and reflection bands may be employed which enable independent direction of the wavelength components onto different optical paths. Alternatively, in the second category, tunable filters may be employed which direct the wavelength components along fixed paths.

Figure 2:
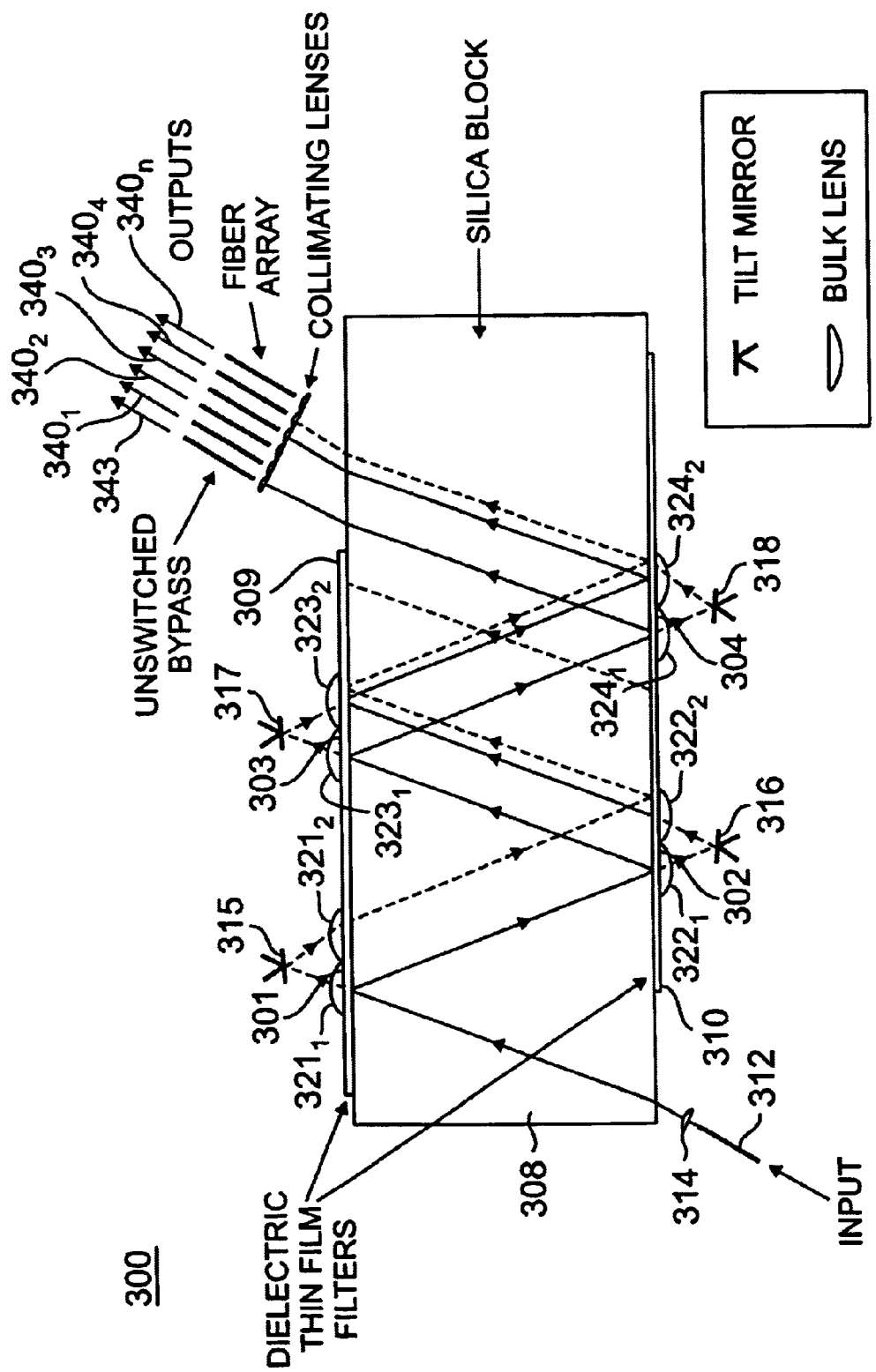
FIG. 2 illustrates one embodiment of the optical switching element according to the present invention.

FIG. 2 illustrates a first embodiment of the optical switching element constructed in accordance with the present invention. In FIG. 2, the optical switching element 300 comprises an optically transparent substrate 308, a plurality of dielectric thin film filters 301, 302, 303, and 304, a plurality of collimating lens pairs $321_1$ and $321_2$, $322_1$ and $322_2$, $323_1$ and $323_2$, $324_1$ and $324_2$, a plurality of tiltable mirrors 315, 316, 317, and 318 and a plurality of output ports 340$_1$, 340$_2$, ... 340$_n$. Substrate 308 has parallel planar surfaces 309 and 310 on which first and second filter arrays are respectively arranged. The first filter array is composed of thin film filters 301 and 303 and the second filter array is composed of thin film filters 302 and 304. Individual ones of the collimating lens pairs 321–324 and tiltable mirrors 315–318 are associated with each of the thin film filters. As described below, each thin film filter, along with its associated collimating lens pair and tiltable mirror effectively forms a narrow band, free space switch, i.e. a switch that routes individual wavelength components along different paths. The overall physical dimensions of switching element 300 will be determined by the beam diameter of the WDM signal.

Thin film filters 301–304 are well-known components (for example, see U.S. Pat. No. 5,583,683), which have a dielectric multilayer configuration. The thin film filters 301–304 have a wavelength dependent characteristic, that is, their reflectivity and transmissivity depends on the wavelength of light. In particular, among the wavelength components of the WDM optical signal received by thin film filter 301, only the component with wavelength $\lambda_1$ is transmitted therethrough. The remaining wavelength components are all reflected by thin film filter 301. Likewise, thin film filter 302 transmits only the component with wavelength $\lambda_2$ and reflects all other wavelengths. In the same manner, the thin film filters 303 and 304 transmit components with wavelengths $\lambda_3$, and $\lambda_4$, respectively, and reflect all other wavelengths. Thus, the present invention demultiplexes wavelengths through a plurality of thin film filters with different pass bands.

The tiltable mirrors 315–318 are any mirrors that can be precisely tilted on 2 axes and are preferably small and very reliable. The exemplary mirrors discussed here are supported by one or more flexure arms that employ a micro-electromechanical system (MEMS). Actuation of the flexure arms tilts the mirror surface to alter the direction of propagation of an incident beam of light. Examples of such micro-electromechanical mirrors are disclosed in U.S. Pat. No. 6,028,689 and the references cited therein. Of course, other mechanisms may be alternatively employed to control the position of the mirrors, such as piezoelectric actuators, for example.

In operation, a WDM optical signal composed of different wavelengths $\lambda_1$, $\lambda_2$, $\lambda_3$ and $\lambda_4$ is directed from the optical input port 312 to a collimator lens 314. The WDM signal traverses substrate 308 and is received by thin film filter 301. According to the characteristics of the thin film filter 301, the optical component with wavelength $\lambda_1$ is transmitted through the thin film filter 301, while the other wavelength components are reflected and directed to thin film filter 302 via substrate 308. The wavelength component $\lambda_1$, which is transmitted through the thin film filter 301, is converged by the collimating lens 321$_1$ onto the tiltable mirror 315. Tiltable mirror 315 is positioned so that wavelength component $\lambda_1$ is reflected from the mirror to a selected one of the output ports 340$_1$-340$_n$ via thin film filters 302–304, which all reflect wavelength component $\lambda_1$. The particular output port that is selected to receive the wavelength component will determine the particular orientation of the mirror 315.

As mentioned, the remaining wavelength components $\lambda_2$, $\lambda_3$, and $\lambda_4$ are reflected by thin film filter 301 back into substrate 308 and directed to thin film 302. Wavelength component $\lambda_2$ is transmitted through thin film filter 302 and lens 322$_1$ and directed to a selected output port by tiltable mirror 316 via thin film filters 303–304, which all reflect wavelength component $\lambda_2$. Similarly, all other wavelength components are separated in sequence by the thin film filters 303–304 and subsequently directed by tiltable mirrors 317–318 to selected output ports. By appropriate actuation of the tiltable mirrors, each wavelength component can be directed to an output port that is selected independently of all other wavelength components. Any wavelengths that have not been redirected by any of the tiltable mirrors may be received by an optional bypass port or fiber 343. Although the embodiment of FIG. 2 is configured to selectively switch four wavelengths, it will be recognized that the invention more generally may selectively switch any number of wavelengths by employing a corresponding number of narrow band, free space switches.

A number of important advantages are achieved by the embodiment of the invention shown in FIG. 2. For example, because free space switching is employed, the number of optical connections is kept to a minimum, reducing the insertion loss, complexity and cost of the device. This advantage will be more clearly demonstrated below when the number of connections required in FIG. 2 is compared to the number of connections required by the embodiment of the invention shown in FIG. 4.

The following description sets forth for illustrative purposes only one particular example of the embodiment of the invention shown in FIG. 2. In this example, the substrate 308 is a rectangular silica block having a thickness of 10 mm, a width of 50 mm and a length of 90 mm. A single collimating lens that directed light to the input fiber is fixed relative to the block at a 5.7° angle with respect to the normal to the block. The focal length of the lens is chosen such that light exiting a Corning SMF-28™ fiber and passing thru a lens results in a collimated optical beam with a width of 1 mm. At the output, an array of collimating lenses is provided, each of which couples light to one fiber in the output array. The fiber ends are polished flat and have an anti-reflective coating. An optional bypass port or fiber may also be provided, which collects any wavelengths received at the input fiber that has not been transmitted through any of the thin film filters. The bypass fiber provides an output for future upgrades that use additional wavelengths not resonant in the original device. Alternately, this port might also be used if cost or loss restrictions make it preferable to switch a subset of the total incident wavelengths, where the remaining (unswitched) wavelengths bypass the switching fabric. The first and second array of narrow band free-space switches each include eight thin film filters. The thin film filters are each a three-cavity resonant thin film filter with a surface dimension of 10 mm by 10 mm. In the first array, the first thin film filter, which is located 10 mm from the edge of the substrate, is bonded with optical-quality, index matching epoxy to the substrate and has a passband centered at 194.0 THz (1545.32 nm). The optical pass band is nominally 0.4 nm wide at −0.5 dB down from the peak, with an isolation of better than −22 dB starting 100 GHz from the center wavelength. A 5 mm focal length collimating lens is bonded to the thin film filter. A commercially available, micro-electro-mechanical (MEMS) tiltable mirror is then positioned at the focal point of the lens. Voltages can be applied to the tiltable mirror to vary its angular orientation along two axes. Typical angles over which the mirror is adjusted do not exceed 30°.

The first array also includes a second narrow band free-space switch located 10 mm from the first free-space switch. The thin film filter employed in this switch has a center optical wavelength of 193.8 THz (1546.92 nm). Six additional narrow band free-space switches are located along the substrate having center wavelengths of 1548.52 nm, 1550.12 nm, 1551.72 nm, 1553.32 nm, 1554.92 nm, and 1556.52 nm, respectively. The center-to-center distance between each switch is 10 mm.

The second array of narrow band free space switches is located on the substrate surface opposing the substrate surface on which the first array of switches is located. The second array of switches, which are also located 10 mm apart from one another, are laterally oriented half way between the first array of switches. The eight thin film filters employed in the second array of switches have center pass band wavelengths of 1544.52 nm, 1546.12 nm, 1547.72 nm, 1549.32 nm, 1550.92 nm, 1552.52 nm, 1554.12 nm, and 1555.72 nm, respectively.

Each individual tiltable mirror has an electronics circuit to which a voltage is applied to steer the mirror. The voltage necessary to steer the mirror so that the wavelength it reflects is directed to a particular output fiber will differ from mirror to mirror. The operating voltages (−20 to +20 volt range) for steering the mirror are chosen to maximize the optical power coupled into the desired output fiber.

One of ordinary skill in the art will recognize that each of the narrow band free space switches shown in FIG. 2 do not necessarily require two lenses and a single mirror. Rather, other combinations of optical elements may be used to properly redirect the wavelength components. For example, two tiltable mirrors may be arranged to achieve the same result without the use of a lens. Alternatively, a single mirror may be used if in addition to being tiltable along two axes its position can also undergo a spatial translation.

It is often important to monitor the presence and intensity of each individual wavelength component received by the switch shown in FIG. 2. This can become particularly difficult using conventional fiber monitoring taps when the WDM signal includes a large number of wavelength components. In the present invention, this problem may be readily overcome since only a single wavelength component is received by each of the tiltable mirrors. Accordingly, individual wavelength components may be monitored by placing a detector behind the mirror so that it receives the small portion of the power of the wavelength component that passes through the mirror. This information combined with conventional tap monitoring can provide network control and administration a more complete monitoring picture of light routed through the switch.

It is also important to maintain accurate alignment between the tiltable mirrors in their various positions and the input and output fibers to optimize the power they receive from the mirrors. This can be accomplished by slow adjustment of the mirrors while monitoring the power coupled to the fiber via conventional fiber monitoring taps. However this approach becomes complicated if many other wavelengths are present on the fiber, in which case it may be useful to improve the detection of each wavelength component by encoding a small amplitude modulation with a unique RF frequency that is detected at the respective output fibers while adjusting the positions of the tiltable mirrors. This RF tone can be encoded at the transmitter with a unique tone for every wavelength, or alternately the RF amplitude modulation can be temporarily encoded during mirror adjustment by providing a small oscillation of the mirror tilt that slightly changes the coupling efficiency to the fiber. The latter approach is beneficial in tones that are encoded where they are measured, eliminating the need to track them throughout the network, and additionally, the tones are only encoded when they are needed for adjustments.

Figure 3:
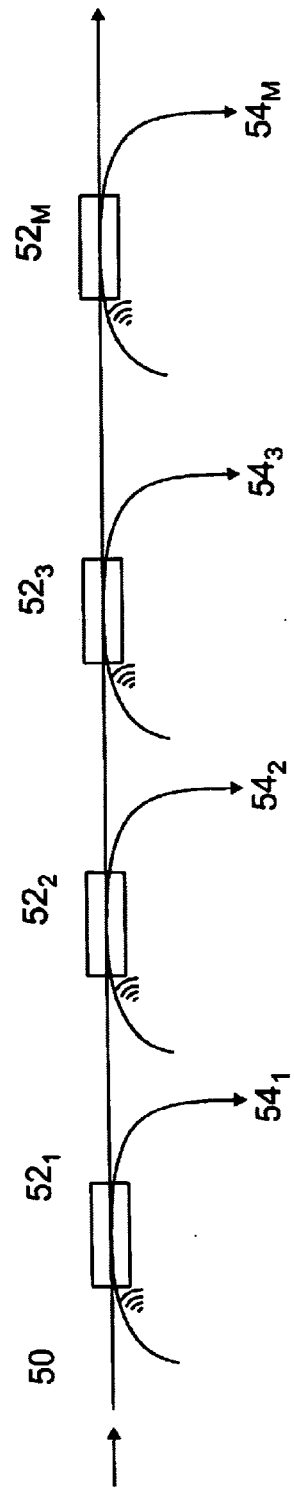
FIG. 3 shows an alternative embodiment of the invention that employs wavelength dependent acoustic null couplers.

FIG. 3 shows an alternative embodiment of the invention that employs wavelength dependent acoustic null couplers to achieve tunable wavelength filtering. Such a coupler only cross-couples selected wavelengths from a first to a second optical fiber upon application of an appropriate acoustic vibration to the coupling region. If the appropriate acoustic vibration is not applied, the selected wavelengths continue to propagate along the first optical fiber. Examples of an acoustic null coupler are disclosed in D. O. Culverhouse et al., Opt. Lett. 22, 96, 1997 and U.S. Pat. No. 5,915,050.

As shown in FIG. 3, an input fiber 50 receiving the WDM signal is connected to an input port of a first null coupler $52_1$. One output port of the first null coupler $52_1$ is connected to an output fiber $54_1$ on which one or more individual wavelength components are to be directed. The other output port is connected to an input port of a second null coupler $52_2$. Similar to the output ports of the first null coupler $52_1$, the output ports of the second null coupler $52_2$ are respectively connected to a second output fiber $54_2$ and the input port of a third null coupler $52_3$. As indicated in FIG. 3, additional null couplers may be cascaded in this manner to provide additional output ports on which selected wavelength components may be directed.

In operation, one or more wavelength components directed along the input fiber 50 can be directed to any selected output port $54_1, 54_2, \ldots 54_m$ by applying the appropriate acoustic wave for those components to the null couplers $52_1, 52_2, \ldots 54_m$ preceding those connected to the selected output port. For example, if any of the given n wavelength components are to be directed to output port $54_3$, then the acoustic waves should be applied to null coupler $52_3$. Although this embodiment of the invention requires the wavelength components to traverse the null couplers in serial fashion, the resulting insertion loss need not be unacceptably large because the insertion of loss of each individual coupler can be quite small (e.g., less than 0.5 dB). The serial tunable filtering process used in the embodiment of the invention shown in FIG. 4 can also achieve the switching functionality of the present invention by using the previously described four-port tunable OADM device technologies.

Figure 4:
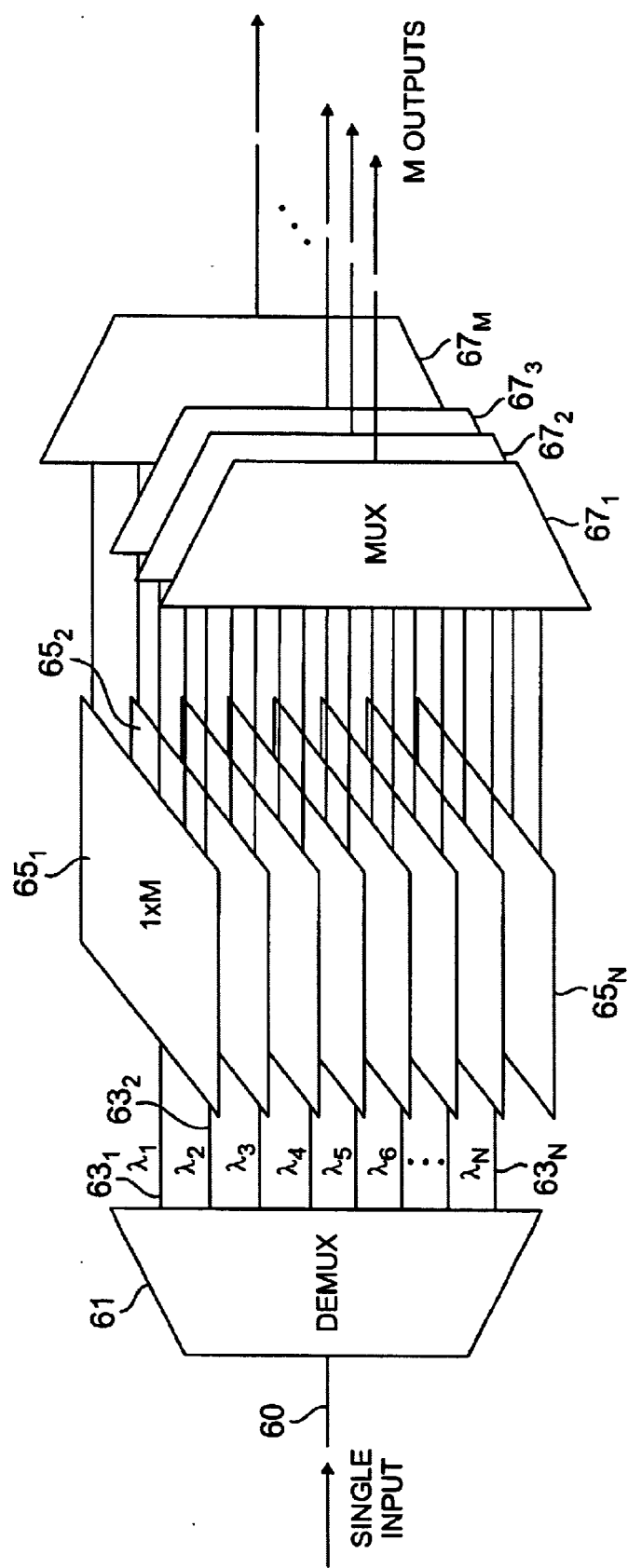
FIG. 4 shows another alternative embodiment of the invention that employs multiplexers/demultiplexers.

FIG. 4 shows another alternative embodiment of the invention that employs conventional multiplexers/demultiplexers and conventional 1 xm switches, where n denotes the number of output ports of the switch. The multiplexers/demultiplexers may be employ thin film filters or waveguide gratings, for example. As shown, an input fiber 60 supporting a WDM signal having n (where n is not necessarily equal to m) wavelength components is directed to the input port of demultiplexer 61. The demultiplexer 61 has n output ports $63_1, 63_2, \ldots 63_n$, which are respectively coupled to the input ports of the 1 xm switches $65_1, 65_2, \ldots 65_n$. The m output ports of the first switch $65_1$ are respectively connected to the first input ports of the multiplexers $67_1, 67_2, \ldots 67_m$. Likewise, the n output ports of the second switch $65_2$ are respectively connected to the second input ports of the multiplexers $67_1, 67_2, \ldots 67_m$. The remaining switches continue to be coupled to the multiplexers in this sequential manner until the output ports of switch $65_n$ are coupled to the mth input ports of the multiplexers $67_1, 67_2, \ldots 67_m$.

One problem with the embodiment of the invention shown in FIG. 4 is that it requires a relatively large number of switches and multiplexers/demultiplexers and thus a relatively large number of optical connections. In particular, in this embodiment of the invention the number of optical connections scales with the product of the number of wavelength components and the number of output ports. Specifically, for an optical switch having 10 output ports and which supports 16 wavelength components the embodiment of the invention shown in FIG. 2 only requires 11 optical connections whereas the embodiment shown in FIG. 4 requires 363 optical connections. Since the cost and complexity of the resulting device is directly related to the number of optical connections, the inventive switch shown in FIG. 2 is particularly attractive.

What is claimed is:

1. An optical switch comprising:
   at least one input port for receiving a WDM optical signal having a plurality of wavelength components;
   at least three output ports;
   a plurality of wavelength selective elements each selecting one of said wavelength components from among the plurality of wavelength components; and
   a plurality of optical elements each associated with one of the wavelength selective elements, each of said optical elements directing the selected wavelength component selected by the associated selected element to a given one of the at least three output ports independently of every other wavelength component, said given output port being variably selectable from among the at least three output ports.

2. The optical switch of claim 1 further comprising a free space region disposed between the input port and the wavelength selective elements.

3. The optical switch of claim 2 wherein said free space region comprises an optically transparent substrate having first and second parallel surfaces, said plurality of wavelength selective elements being arranged in first and second arrays extending along the first and second parallel surfaces, respectively.

4. The optical element of claim 3 wherein said first and second arrays are laterally offset with respect to one another.

5. The optical switch of claim 3 wherein said optical element is a MEM mirror tiltable in a plurality of positions such that in each of the positions the MEM mirror reflects the wavelength component incident thereon to a different one of the output ports.

6. The optical element of claim 5 wherein each of said wavelength selective elements arranged in the first array direct the selected wavelength component to another of said wavelength selective elements arranged in the second array.

7. The optical switch of claim 1 wherein said wavelength selective elements are thin film filters each transmitting therethrough a different one of the wavelength components and reflecting the remaining wavelength components.

8. The optical switch of claim 7 further comprising a detector associated with each of the wavelength selected elements for monitoring the wavelength component transmitted therethrough.

9. The optical switch of claim 1 wherein said optical elements are micro-electromechanical (MEM) optical elements.

10. The optical switch of claim 9 wherein said MEM optical elements are MEM mirrors.

11. The optical switch of claim 10 wherein said MEM mirror is tiltable in a plurality of positions such that in each of the positions the MEM mirror reflects the wavelength component incident thereon to a different one of the output ports.

12. The optical switch of claim 1 wherein said optical elements are mirrors that are selectively tiltable in a plurality of positions such that in each of the positions the mirrors reflect the wavelength component incident thereon to a different one of the output ports.

13. The optical switch of claim 12 wherein said mirrors each include a piezoelectric actuator.

14. The optical switch of claim 12 wherein said optical elements each include a pair of mirrors.

15. The optical switch of claim 12 wherein said optical elements each include a tiltable mirror that is also spatially translatable.

16. The optical switch of claim 1 further comprising a pair of collimating lenses disposed between each one of said wavelength selective elements and the optical element associated therewith, each of said optical elements being positioned at a focal point of each lens in its associated collimating lens pair.

17. The optical switch of claim 1 wherein said optical elements each include a pair of collimating lenses and a tiltable mirror.

18. A method for directing at least first and second wavelength components of a WDM signal that includes a plurality of wavelength components from an input port to selected ones of a plurality of output ports, said method comprising the steps of:
   (a) demultiplexing the first wavelength component from the WDM signal;
   (b) directing the first wavelength component to a given output port;
   (c) demultiplexing the second wavelength component from the WDM signal and directing the second wavelength component to one of the output ports selected independently from the given output port, wherein step (c) is performed subsequent to steps (a) and (b), wherein said plurality of output ports includes at least three output ports and wherein step (c) includes the step of directing the second wavelength component to any of said at least three output ports selected independently from the given output port.

19. The method of claim 18 wherein the steps of directing the first and second wavelength components includes the steps of directing the first and second wavelength components through a free space region.

20. The method of claim 19 wherein the first wavelength component is directed through the free space region by a tiltable mirror.

21. The method of claim 20 wherein the tiltable mirror is a MEM mirror.

22. The method of claim 20 wherein said tiltable mirror includes a pair of tiltable mirrors.

23. The method of claim 20 wherein said tiltable mirror includes a piezoelectric actuator.

24. The method of claim 20 further comprising the step of collimating the first wavelength component onto the tiltable mirror.

25. The method of claim 19 wherein the first wavelength component is directed by a spatially translatable mirror.

26. The method of claim 18 wherein the first wavelength component is demultiplexed by a thin film filter having a passband corresponding to the first wavelength component.

27. The method of claim 18 wherein the demultiplexing and directing steps are performed by a plurality of narrow band free space switches.

28. The method of claim 18 wherein the first and second wavelength components are directed to said output ports by a plurality of tunable, wavelength selective couplers.

29. The method of claim 18 wherein said plurality of output ports includes M output ports and the demultiplexing and directing steps are performed by a demultiplexer, M multiplexers, and a plurality of 1×M switches coupling said demultiplexer to said M multiplexers, where M>2.

30. The method of claim 18 further comprising the step of monitoring the first wavelength component after performing the demultiplexing step.

31. An optical switch comprising:
at least one input port for receiving a WDM optical signal having a plurality of wavelength components;
a plurality of output ports;
means for selecting at least one of said wavelength components from among the plurality of wavelength components and directing the at least one selected wavelength component to a given one of the plurality of output ports independently of every other wavelength component, said given output port being variably selectable from among the plurality of output ports, wherein said selecting and directing means comprises a plurality of narrow band free space switches, and wherein said narrow band free space switch includes a thin film filter and a tiltable optical element.

32. The optical switch of claim 31 wherein said narrow band free space switch includes a thin film filter and a pair of tiltable mirrors.

33. The optical switch of claim 31 wherein said narrow band free space switch includes a thin film filter and a tiltable mirror that is also spatially translatable.

34. The optical switch of claim 31 wherein said selecting and directing means comprises a plurality of tunable, wavelength selective couplers.

35. The optical switch of claim 34 wherein said couplers are acoustic wave null couplers.

36. The optical switch of claim 31 wherein said plurality of output ports includes M output ports and said selecting and directing means comprises a demultiplexer, M multiplexers, and a plurality of 1×M switches coupling said demultiplexer to said M multiplexers, where M>2.

37. The optical switch of claim 31 further comprising a detector associated with each of the narrow band free space switches.

38. An optical switch comprising:
at least one input port for receiving a WDM optical signal having a plurality of wavelength components;
at least three output ports;
at least one wavelength selective element selecting each of said wavelength components from among the plurality of wavelength components; and
a plurality of optical elements each receiving a distinct one of the wavelength components from the at least one wavelength selective element, each of said optical elements directing the received wavelength component to a given one of the at least three output ports independently of every other wavelength component, said given output port being variably selectable from among the at least three output ports.

39. The optical switch of claim 38 further comprising a free space region disposed between the input port and said at least one wavelength selective element.

40. The optical switch of claim 39 wherein said free space region comprises an optically transparent substrate having first and second parallel surfaces and said at least one wavelength selective element comprises a plurality of wavelength selective elements, said plurality of wavelength selective elements being arranged in first and second arrays extending along the first and second parallel surfaces, respectively.

41. The optical element of claim 40 wherein said first and second arrays are laterally offset with respect to one another.

42. The optical switch of claim 40 wherein said optical element is a MEM mirror tiltable in a plurality of positions such that in each of the positions the MEM mirror reflects the wavelength component incident thereon to a different one of the output ports.

43. The optical element of claim 42 wherein each of said wavelength selective elements arranged in the first array direct the selected wavelength component to another of said wavelength selective elements arranged in the second array.

44. The optical switch of claim 38 wherein said at least one wavelength selective element comprises a plurality of thin film filters each transmitting therethrough a different one of the wavelength components and reflecting the remaining wavelength components.

45. The optical switch of claim 38 wherein said optical elements are micro-electromechanical (MEM) optical elements.

46. The optical switch of claim 45 wherein said MEM optical elements are MEM mirrors.

47. The optical switch of claim 46 wherein said MEM mirror is tiltable in a plurality of positions such that in each of the positions the MEM mirror reflects the wavelength component incident thereon to a different one of the output ports.

48. The optical switch of claim 38 wherein said optical elements are mirrors that are selectively tiltable in a plurality of positions such that in each of the positions the mirrors reflect the wavelength component incident thereon to a different one of the output ports.

49. The optical switch of claim 48 wherein said mirrors each include a piezoelectric actuator.

50. The optical switch of claim 48 wherein said optical elements each include a pair of mirrors.

51. The optical switch of claim 48 wherein said optical elements each include a tiltable mirror that is also spatially translatable.

52. The optical switch of claim 38 wherein said optical elements each include a collimating lens and a tiltable mirror.

53. An optical switch comprising.
at least one input port for receiving a WDM signal having N wavelength components, where N is an integer $\geq 2$;
M output ports where M is an integer $\geq 3$; and
N narrow band, free space switches, wherein for each switch i, where i is an integer from 1 to N, said ith switch selects the ith wavelength component and directs said ith component to a given one of the output ports independently of the output ports to which all of the remaining (N−1) switches direct their respectively selected wavelength components, and wherein said ith switch selects and directs the ith wavelength component regardless of the input port at which said ith wavelength component is received.

54. The optical switch of claim 53 wherein the N switches collectively include at least one wavelength selective element that selects each of the N wavelength components.

55. The optical switch of claim 54 wherein each of the N switches include an optical element that directs the wavelength component received from the at least one wavelength selective element to a given one of the output ports.

56. The optical switch of claim 53 wherein each of said narrow band free space switches includes a thin film filter and a tiltable optical element.

57. The optical switch of claim 53 wherein each of said narrow band free space switches includes a thin film filter and a pair of tiltable mirrors.

58. The optical switch of claim 53 wherein each of said narrow band free space switches includes a thin film filter and a tiltable mirror that is also spatially translatable.

59. The optical switch of claim 53 further comprising a detector associated with each of the narrow band free space switches.

60. An optical switch comprising:

at least one input port for receiving a WDM optical signal having a plurality of wavelength components;

at least three output ports;

a plurality of wavelength selective elements being arranged so that a first of said wavelength selective elements selects a first wavelength component from among the plurality of wavelength components before a second of said wavelength selective elements selects a second wavelength component from among the plurality of wavelength components; and a plurality of optical elements each associated with one of the wavelength selective elements, each of said optical elements directing the selected wavelength component selected by the associated wavelength selective element to a given one of the at least three output ports independently of every other wavelength component, said given output port being variably selectable from among the at least three output ports, wherein a first of said optical elements associated with the first wavelength selective element is arranged to direct the selected wavelength component to the given output port before said second of the wavelength selective elements selects the second wavelength component from among the plurality of wavelength components.

61. The optical switch of claim 60 further comprising a free space region disposed between the input port and the wavelength selective elements.

62. The optical switch of claim 61 wherein said free space region comprises an optically transparent substrate having first and second parallel surfaces, said plurality of wavelength selective elements being arranged in first and second arrays extending along the first and second parallel surfaces, respectively.

63. The optical element of claim 62 wherein said first and second arrays are laterally offset with respect to one another.

64. The optical switch of claim 62 wherein said optical element is a MEM mirror tiltable in a plurality of positions such that in each of the positions the MEM mirror reflects the wavelength component incident thereon to a different one of the output ports.

65. The optical element of claim 64 wherein each of said wavelength selective elements arranged in the first array direct the selected wavelength component to another of said wavelength selective elements arranged in the second array.

66. The optical switch of claim 60 wherein said wavelength selective elements are thin film filters each transmitting therethrough a different one of the wavelength components and reflecting the remaining wavelength components.

67. The optical switch of claim 60 wherein said optical elements are micro-electromechanical (MEM) optical elements.

68. The optical switch of claim 67 wherein said MEM optical elements are MEM mirrors.

69. The optical switch of claim 68 wherein said MEM mirror is tiltable in a plurality of positions such that in each of the positions the MEM mirror reflects the wavelength component incident thereon to a different one of the output ports.

70. The optical switch of claim 60 wherein said optical elements are mirrors that are selectively tiltable in a plurality of positions such that in each of the positions the mirrors reflect the wavelength component incident thereon to a different one of the output ports.

71. The optical switch of claim 70 wherein said mirrors each include a piezoelectric actuator.

72. The optical switch of claim 70 wherein said optical elements each include a pair of mirrors.

73. The optical switch of claim 70 wherein said optical elements each include a tiltable mirror that is also spatially translatable.

74. The optical switch of claim 60 further comprising a pair of collimating lenses disposed between each one of said wavelength selective elements and the optical element associated therewith, each of said optical elements being positioned at a focal point of each lens in its associated collimating lens pair.

75. The optical switch of claim 60 wherein said optical elements each include a plurality of collimating lenses and a tiltable mirror.

76. A method for directing at least first and second wavelength components of a WDM signal that includes a plurality of wavelength components from an input port to selected ones of at least three output ports, said method comprising the steps of:

(a) demultiplexing the first wavelength component from the WDM signal;

(b) directing the first wavelength component to a given output port;

(c) demultiplexing the second wavelength component from the WDM signal; and (d) directing the second wavelength components to any selected one of the at least three output ports selected independently from the given output port.

77. The method of claim 76 wherein steps (c) and (d) are performed subsequent to steps (a) and (b).

78. The method of claim 76 wherein the steps of directing the fist and second wavelength components includes the steps of directing the first and second wavelength components through a free space region.

79. The method of claim 78 wherein the first wavelength component is directed through the free space region by a tiltable mirror.

80. The method of claim 79 wherein the tiltable mirror is a MEM mirror.

81. The method of claim 79 wherein said tiltable mirror includes a pair of tiltable mirrors.

82. The method of claim 79 wherein said tiltable mirror includes a piezoelectric actuator.

83. The method of claim 79 further comprising the step of collimating the first wavelength component onto the tiltable mirror.

84. The method of claim 78 wherein the first wavelength component is directed by a spatially translatable mirror.

85. The method of claim 76 wherein the first wavelength is demultiplexed by a thin film filter having a passband corresponding to the first wavelength.

86. The method of claim 76 wherein the demultiplexing and directing steps are performed by a plurality of narrow band free space switches.

87. The method of claim 76 wherein the demultiplexing and directing steps are performed by a plurality of tunable, wavelength selective couplers.

88. The method of claim 76 wherein said at least three output ports includes N output ports and the demultiplexing and directing steps are performed by a demultiplexer, N multiplexers, and a plurality of 1×M switches coupling said demultiplexer to said N multiplexers, where M>1.

* * * * *

UNITED STATES PATENT AND TRADEMARK OFFICE
CERTIFICATE OF CORRECTION

| | | |
|---|---|---|
| PATENT NO. | : 6,631,222 B1 | Page 1 of 1 |
| APPLICATION NO. | : 09/571833 | |
| DATED | : October 7, 2003 | |
| INVENTOR(S) | : Jefferson L. Wagener et al. | |

It is certified that error appears in the above-identified patent and that said Letters Patent is hereby corrected as shown below:

Specification, Col. 6, line 38, after "that", change "has" to -- have --.

Specification, Col. 8, line 44, before "employ", delete -- be --.

Claim 76(d), Col. 14, line 28, after "wavelength", change "components" to -- component --.

Claim 78, Col. 14, line 34, before "and", change "fist" to -- first --.

Claim 88, Col. 14, line 62, after "ports", change "includes" to -- include --.

Signed and Sealed this

Seventh Day of August, 2007

JON W. DUDAS
*Director of the United States Patent and Trademark Office*